: US010434488B2

(12) United States Patent
Lansell et al.

(10) Patent No.: US 10,434,488 B2
(45) Date of Patent: Oct. 8, 2019

(54) SYSTEMS AND METHODS FOR FACILITATING DISSOCIATION OF METHANE UTILIZING A REACTOR DESIGNED TO GENERATE SHOCKWAVES IN A SUPERSONIC GASEOUS VORTEX

(71) Applicant: LLT International (Ireland) Ltd., Dublin (IE)

(72) Inventors: Peter Lansell, Kew (AU); William Keating, Fairfield (AU); David Lowe, Alphington (AU); Dominic Evans, Victoria (AU)

(73) Assignee: LLT INTERNATIONAL (IRELAND) LTD., Dublin (IE)

( * ) Notice: Subject to any disclaimer, the term of this patent is extended or adjusted under 35 U.S.C. 154(b) by 0 days.

(21) Appl. No.: 14/823,890

(22) Filed: Aug. 11, 2015

(65) Prior Publication Data

US 2017/0043315 A1  Feb. 16, 2017

(51) Int. Cl.
  *C01B 3/24*  (2006.01)
  *B01J 19/10*  (2006.01)

(52) U.S. Cl.
  CPC .......... *B01J 19/10* (2013.01); *C01B 3/24* (2013.01); *B01J 2219/0869* (2013.01);
  (Continued)

(58) Field of Classification Search
  CPC ............... B01J 19/10; B01J 2219/08; B01J 2219/0871; B01J 2219/0875;
  (Continued)

(56) References Cited

U.S. PATENT DOCUMENTS

| 2,257,907 A | 10/1941 | Griswold .................... 252/291 |
| 2,532,554 A * | 12/1950 | Joeck ..................... B01J 19/10 |
| | | 116/137 A |

(Continued)

FOREIGN PATENT DOCUMENTS

| CN | 103249667 A | 8/2013 |
| DE | 102013019949 | 5/2015 |

(Continued)

OTHER PUBLICATIONS

International Preliminary Report on Patentability and the Written Opinion of the International Searching Authority as issued in International Patent Application No. PCT/US2015/034554, dated Sep. 3, 2015.

(Continued)

*Primary Examiner* — Nicholas A Smith
*Assistant Examiner* — Colleen M Raphael
(74) *Attorney, Agent, or Firm* — Pillsbury Winthrop Shaw Pittman LLP

(57) ABSTRACT

Methane may be dissociated at low temperatures and/or pressures utilizing a reactor designed to generate shockwaves in a supersonic gaseous vortex. Within a preprocessing chamber, the methane may be pressurized to a pressure of 700 kPa or more, and heated to a temperature below a dissociation temperature of methane. The methane may be introduced as a gas stream substantially tangentially to an inner surface of a chamber of the reactor to effectuate a gaseous vortex rotating about a longitudinal axis within the chamber. The gas stream may be introduced using a nozzle that accelerates the gas stream to a supersonic velocity. A frequency of shockwaves emitted from the nozzle into the gaseous vortex may be controlled. Product gas and carbon byproduct may be emitted from the chamber of the reactor.

(Continued)

The carbon byproduct may be separated out from the product gas using a gas/solid separator.

20 Claims, 7 Drawing Sheets

(52) U.S. Cl.
CPC .......................... *B01J 2219/0875* (2013.01); *B01J 2219/0892* (2013.01); *C01B 2203/0272* (2013.01); *C01B 2203/1241* (2013.01)

(58) Field of Classification Search
CPC ....... B01J 2219/0869; B01J 2219/0892; C01B 3/24; C01B 2203/0272; C01B 2203/1241
USPC .............................. 204/157.15; 422/127–128
See application file for complete search history.

(56) References Cited

U.S. PATENT DOCUMENTS

| | | | |
|---|---|---|---|
| 2,752,097 A * | 6/1956 | Lecher .................... B01J 19/10 241/17 |
| 2,997,245 A | 8/1961 | Nilsson et al. | |
| 3,178,121 A | 4/1965 | Wallace, Jr. ........................ 241/5 |
| 3,254,848 A | 6/1966 | Stephanoff ...................... 241/39 |
| 3,257,080 A | 6/1966 | Snyder .............................. 241/5 |
| 3,301,292 A | 1/1967 | O'Connor .................. 146/221.5 |
| 3,462,086 A | 8/1969 | Bertrand et al. .................. 241/5 |
| 3,565,348 A | 2/1971 | Dickerson et al. ............... 241/5 |
| 3,602,439 A | 8/1971 | Nakayama ...................... 241/39 |
| 3,620,946 A | 11/1971 | Michel | |
| 3,908,904 A | 9/1975 | Kerner et al. | |
| 4,198,004 A | 4/1980 | Albus et al. ..................... 241/39 |
| 4,248,387 A | 2/1981 | Andrews ........................... 241/5 |
| 4,354,641 A | 10/1982 | Smith | |
| 4,504,017 A | 3/1985 | Andrews | |
| 4,515,093 A | 5/1985 | Beardmore et al. .......... 110/347 |
| 4,671,192 A | 6/1987 | Hoffert et al. ................ 110/347 |
| 4,919,853 A * | 4/1990 | Alvarez ................ B05B 7/0416 261/142 |
| 4,921,173 A | 5/1990 | Bartley | |
| 5,219,530 A | 6/1993 | Hertzberg et al. | |
| 5,246,575 A | 9/1993 | Alexander | |
| 5,277,369 A | 1/1994 | Moriya et al. | |
| 5,306,330 A * | 4/1994 | Nasikas ................. B01D 45/12 55/394 |
| 5,855,326 A | 1/1999 | Beliaysky ......................... 241/5 |
| 6,089,026 A * | 7/2000 | Hu .......................... F25B 9/065 62/6 |
| 6,145,765 A | 11/2000 | Capelle, Jr. et al. ............. 241/5 |
| 6,152,158 A * | 11/2000 | Hu .......................... F16K 47/04 137/14 |
| 6,158,676 A | 12/2000 | Hughes | |
| 6,167,323 A * | 12/2000 | Komino ................ C23C 16/455 700/121 |
| 6,824,086 B1 | 11/2004 | Mazurkiewicz et al. | |
| 7,137,580 B2 | 11/2006 | Graham et al. .................... 241/1 |
| 7,258,290 B2 | 8/2007 | Taketomi et al. | |
| 7,398,934 B1 | 7/2008 | Capelle, Jr. ....................... 241/5 |
| 7,621,473 B2 | 11/2009 | Capelle, Jr. ....................... 241/5 |
| 7,789,331 B2 | 9/2010 | Zehavi et al. ..................... 241/5 |
| 7,850,105 B2 | 12/2010 | Ito et al. .......................... 241/39 |
| 8,172,163 B2 | 5/2012 | Soliman Abdalla et al. .... 241/1 |
| 8,398,007 B2 | 3/2013 | Ito et al. .......................... 241/39 |
| 8,480,859 B2 | 7/2013 | Kostrov et al. ............ 196/14.52 |
| 8,726,532 B2 | 5/2014 | Hogan | |
| 9,050,604 B1 | 6/2015 | Lansell et al. | |
| 9,452,434 B1 | 9/2016 | Lansell et al. | |
| 2004/0063874 A1 | 4/2004 | Muhle et al. | |
| 2004/0200910 A1* | 10/2004 | Graham ................. B02C 19/06 241/5 |
| 2006/0144760 A1* | 7/2006 | Duyvesteyn ............ B01J 19/26 208/128 |
| 2007/0267527 A1 | 11/2007 | Graham et al. ................. 241/39 |
| 2008/0226535 A1 | 9/2008 | Park et al. .................. 423/447.3 |
| 2008/0236160 A1* | 10/2008 | Glotov ..................... B01J 19/10 60/530 |
| 2009/0241816 A1 | 10/2009 | Taylor | |
| 2010/0025506 A1 | 2/2010 | Capelle, Jr. ........................ 241/5 |
| 2010/0101978 A1 | 4/2010 | Gordon et al. | |
| 2011/0206593 A1 | 8/2011 | Fahs, II et al. ............... 423/351 |
| 2011/0283705 A1 | 11/2011 | Oliver | |
| 2011/0303013 A1* | 12/2011 | Kass ...................... G01N 29/28 73/632 |
| 2012/0131901 A1* | 5/2012 | Westervelt ............. F02C 9/266 60/204 |
| 2012/0230877 A1 | 9/2012 | Pinchot ......................... 422/128 |
| 2013/0221141 A1 | 8/2013 | Zhang et al. .................... 241/39 |
| 2013/0224488 A1 | 8/2013 | Dos Santos Antunes et al. | |
| 2013/0309161 A1 | 11/2013 | Akay | |
| 2013/0315792 A1 | 11/2013 | O'Dowd | |
| 2013/0336845 A1 | 12/2013 | Chu .............................. 422/128 |
| 2014/0058095 A1* | 2/2014 | Rende ..................... B01J 19/10 422/128 |
| 2014/0058165 A1 | 2/2014 | Bedard et al. | |
| 2014/0058170 A1* | 2/2014 | Bedard ................... B01J 19/26 422/128 |
| 2014/0058178 A1* | 2/2014 | Bedard ................... B01J 19/02 422/128 |
| 2014/0110307 A1 | 4/2014 | Salazar-Guillen | |
| 2014/0275687 A1 | 9/2014 | Beene et al. | |
| 2015/0165414 A1* | 6/2015 | Gattupalli ............... B01J 19/10 422/128 |
| 2015/0352558 A1 | 12/2015 | Lansell et al. | |
| 2015/0361010 A1 | 12/2015 | Leonard | |
| 2016/0243488 A1 | 8/2016 | Wells et al. | |
| 2016/0296904 A1* | 10/2016 | Knowlen ................ B01J 19/10 |
| 2017/0253492 A1 | 9/2017 | Beach et al. | |

FOREIGN PATENT DOCUMENTS

| | | | | |
|---|---|---|---|---|
| EA | 000004 | | 9/1997 | |
| FR | 1048667 | A | 12/1953 | |
| GB | 1037770 | | 8/1966 | |
| GB | 1037770 | A * | 8/1966 | ........... B02C 19/061 |
| RU | 2 029 621 | | 2/1995 | |
| RU | 2520 | U1 | 8/1996 | |
| RU | 2 088 336 | | 8/1997 | |
| WO | WO 94/08719 | | 4/1994 | |
| WO | WO 97/33695 | | 9/1997 | |
| WO | 2006/067636 | A2 | 6/2006 | |
| WO | 2008/083138 | | 7/2008 | |
| WO | 2009/073447 | A2 | 6/2009 | |
| WO | 2014/210297 | A1 | 12/2014 | |
| WO | 2015/053857 | A2 | 4/2015 | |

OTHER PUBLICATIONS

International Preliminary Report on Patentability and the Written Opinion of the International Searching Authority as issued in International Patent Application No. PCT/US2015/034548, dated Sep. 8, 2015.
Hartmann, J. et al, "Synchronisation of Air-Jet Generators with an Appendix on the Stem Generator", Det Kgl. Danske Videnskabernes Selskab. Matematisk-fysiske Meddelelser, Bd. 26, No. 10, 1951(39 pages).
Demare, D., et al., "Acoustic enhancement of combustion in lifted non-remixed jet flames", The Combusion Institute, 139 (2004), 312-328, Elsevier, Inc.
Simpson, E., et al., Acoustic Performance of a Cylindrical Disk-Type Resonator, Journal of Sound and Vibration, (1978) 60(1), 151-156, Academic Press Inc. (London) Limited.
Narayanan, S., et al. "Acoustic characteristics of chamfered Hartmann whistles", Journal of Sound and Vibration, 330 (2011) 2470-2496, Elsevier, Ltd.
Narayanan, S. et al., Aero-acoustic features of internal and external chamfered Hartmann whistles: A comparative study, Journal of Sound and Vibration, 333 (2014) 774-787, Elsevier, Ltd.

(56) References Cited

OTHER PUBLICATIONS

English machine translation for FR 1048667 A (Dec. 1953).
Final Office Action dated Jan. 27, 2017 in corresponding U.S. Appl. No. 14/690,149 (14 pages).
Derwent abstract of DE 102013019949 A1.
International Preliminary Report on Patentability PCT/US2016/028167 dated Oct. 17, 2017.
International Preliminary Report on Patentability PCT/US2016/028181 dated Oct. 17, 2017.
International Search Report and Written Opinion dated Sep. 26, 2016 in corresponding International Patent Application No. PCT/US2016/046641.
Final Office Action dated Dec. 6, 2016 in corresponding U.S. Appl. No. 14/298,877 (10 pages).
M. Reader-Harris, Orifice Plates and Venturi Tubes, Chapter 3: Venturi Tube Design, 2015, pp. 77-96.
Non-Final Office Action U.S. Appl. No. 14/690,149 dated Jan. 25, 2018.
International Preliminary Report on Patentability PCT/US2016/046641 dated Feb. 13, 2018.
Final Office Action U.S. Appl. No. 14/690,149 dated Sep. 4, 2018.
Notice of Allowance U.S. Appl. No. 141719,303 dated Jul. 25, 2018.
Details of the First Office Action Chinese Patent Application No. 201680035572.0 dated Jul. 24, 2018 with English translation.
Extended European Search Report dated Dec. 13, 2018 in related European Patent Application No. 16781030.8, 10 pages.
Non-Final Office Action dated Jan. 10, 2019 in related U.S. Appl. No. 15/277,975, 10 pages.
Decision to Grant dated Jan. 15, 2019 in related Chinese Patent Application No. 201680035572.0, 4 pages.
Notice of Allowance dated Jan. 11, 2019 in related U.S. Appl. No. 14/690,149, 8 pages.
Notice of Grant received on Apr. 10, 2019 in related Kazakstani Patent Application No. 2017/1058.1, 14 pages.
Notice of Allowance dated May 22, 2019 in related U.S. Appl. No. 14/690,149, 7 pages.
Final Office Action dated May 3, 2019 in related U.S. Appl. No. 15/277,975, 11 pages.

* cited by examiner

SYSTEMS AND METHODS FOR FACILITATING DISSOCIATION OF METHANE UTILIZING A REACTOR DESIGNED TO GENERATE SHOCKWAVES IN A SUPERSONIC GASEOUS VORTEX

FIELD OF THE DISCLOSURE

This disclosure relates to systems and methods for facilitating dissociation of methane at low temperatures and/or pressures utilizing a reactor designed to generate shockwaves in a supersonic gaseous vortex.

BACKGROUND

In recent times, there has been a surge in methane produced from hydraulic and explosive fracturing and/or gas production from conventional gas wells in the continental United States and elsewhere around the world. This has led to the price of methane and natural gas falling to the point where many wells are being capped because they are no longer economical. There are many gas wells and oil wells around the world that are either stranded or too small for a pipeline to connect them into the main gas pipeline system. As such, the gas is typically flared or burnt. This gas flaring may represent a very heavy increase in production of carbon dioxide and $CO_2$ equivalents attributed to global climate change. This flaring may also represents a very significant waste of energy and money. Conventional technologies exist for converting methane into useful products that commonly include the Haber Bosch process, which converts nitrogen extracted from ambient air together with hydrogen extracted from methane to produce ammonia, urea, and/or other products. Generally speaking, existing technologies involve high-pressure and high-temperature and are very difficult to implement on a small scale.

SUMMARY

One aspect of the disclosure relates to a system configured for facilitating dissociation of methane at low temperatures and/or pressures utilizing a reactor designed to generate shockwaves in a supersonic gaseous vortex. According to exemplary implementations, the system, by using a combination of mechano chemistry and catalysis, may achieve disassociation of methane at relatively low temperatures and/or relatively low pressures. The system may be scaled across a very wide range from implementations configured to process kilos of methane per hour to implementations configured to process thousands of kilos of methane per hour. In some implementations, because the temperature and pressures are restricted to a relatively small reactor, the reactor may be constructed from non-exotic materials.

In accordance with one or more implementations, the system may include one or more of a preprocessing chamber, a reactor, a gas/solid separator, and/or other components. The preprocessing chamber may be configured to receive methane. The preprocessing chamber may be configured to pressurize the methane to a pressure of 300 kPa or more. The preprocessing chamber may be configured to heat the methane to a temperature below a dissociation temperature of methane. The reactor may be configured to dissociate methane received from the preprocessing chamber. The reactor may be configured to operate at a temperature above the dissociation temperature of methane. The reactor may include a chamber having an internal surface that is substantially axially symmetrical about a longitudinal axis. The reactor may include a gas inlet disposed at a first end of the chamber and arranged to emit the methane as a gas stream substantially tangentially to the inner surface of the chamber to effectuate a gaseous vortex rotating about the longitudinal axis within the chamber. The gas inlet may comprise a nozzle that accelerates the gas stream to a supersonic velocity. The nozzle may be structured to adjustably control a frequency of shockwaves emitted from the nozzle into the gaseous vortex. The reactor may include an outlet disposed on the longitudinal axis at a second end of the chamber opposite from the first end. The outlet may be configured to emit product gases and carbon byproduct from the chamber. The gas/solid separator may be configured to receive the product gases and carbon byproduct from the reactor and separate out the carbon byproduct from the product gases.

Another aspect of the disclosure relates to a method for facilitating dissociation of methane at low temperatures and/or pressures utilizing a reactor designed to generate shockwaves in a supersonic gaseous vortex. The method may include receiving methane into a preprocessing chamber. The method may include pressurizing the methane within the preprocessing chamber to a pressure of 350 kPa or more. The method may include heating the methane within the preprocessing chamber to a temperature below a dissociation temperature of methane. The method may include introducing the pressurized and heated methane from the preprocessing chamber into a reactor configured to dissociate methane. The reactor may be configured to operate at a temperature above the dissociation temperature of methane. The methane may be introduced into the reactor as a gas stream substantially tangentially to an inner surface of a chamber of the reactor to effectuate a gaseous vortex rotating about the longitudinal axis within the chamber. The gas stream may be introduced via a gas inlet. The gas inlet may comprise a nozzle that accelerates the gas stream to a supersonic velocity. The method may include controlling a frequency of shockwaves emitted from the nozzle into the gaseous vortex. The method may include emitting product gas and carbon byproduct from the chamber of the reactor via an outlet disposed on the longitudinal axis at a second end of the chamber opposite from the first end. The method may include separating out the carbon byproduct from the product gas using a gas/solid separator.

Exemplary implementations may provide a very economical way of producing large quantities of carbon and hydrogen. Gas that would otherwise be flared may instead be turned into useful end products. Carbon may be traded or used to improve soil fertility. Hydrogen may be used for clean energy production with the exhaust being water. It should be noted, however, that for some implementations only some (or none) of the identified advantages may be present and the potential advantages are not necessarily required for all of the implementations.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
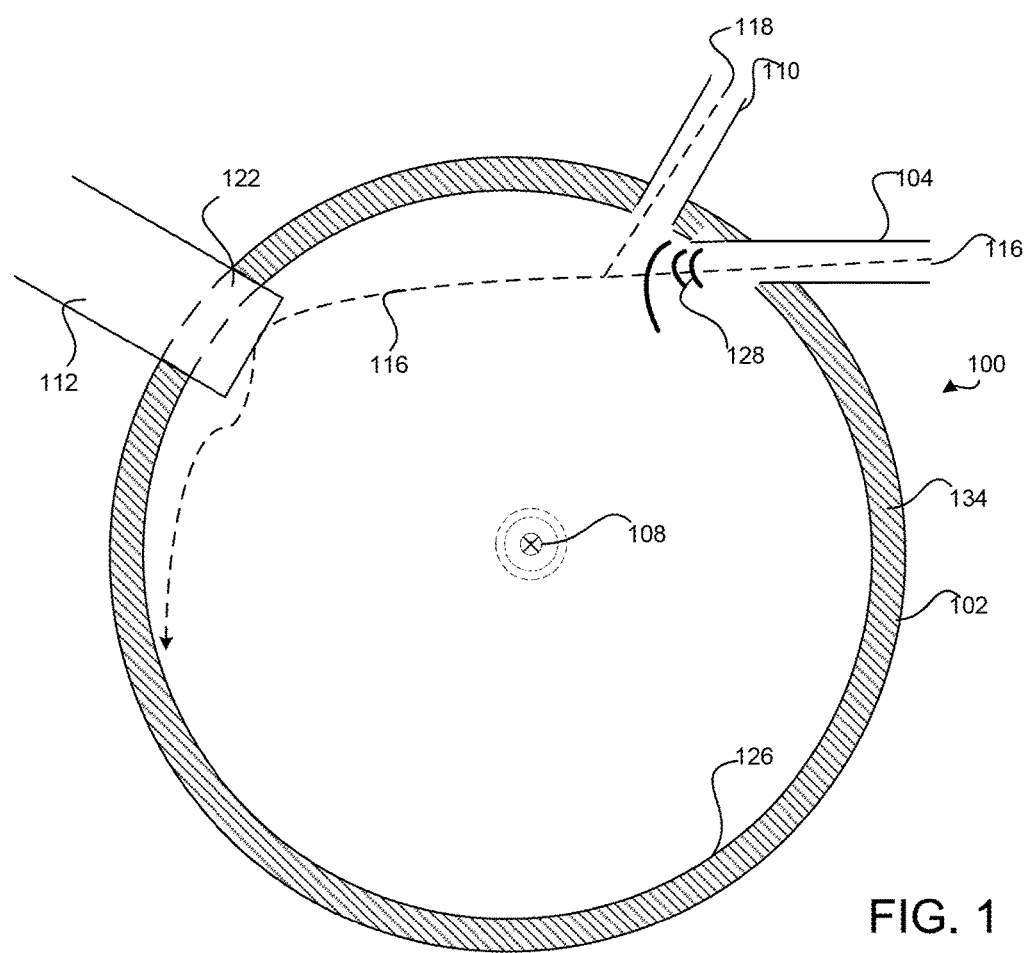
FIG. 1 illustrates a top view of a reactor, in accordance with one or more implementations.
Figure 1A:
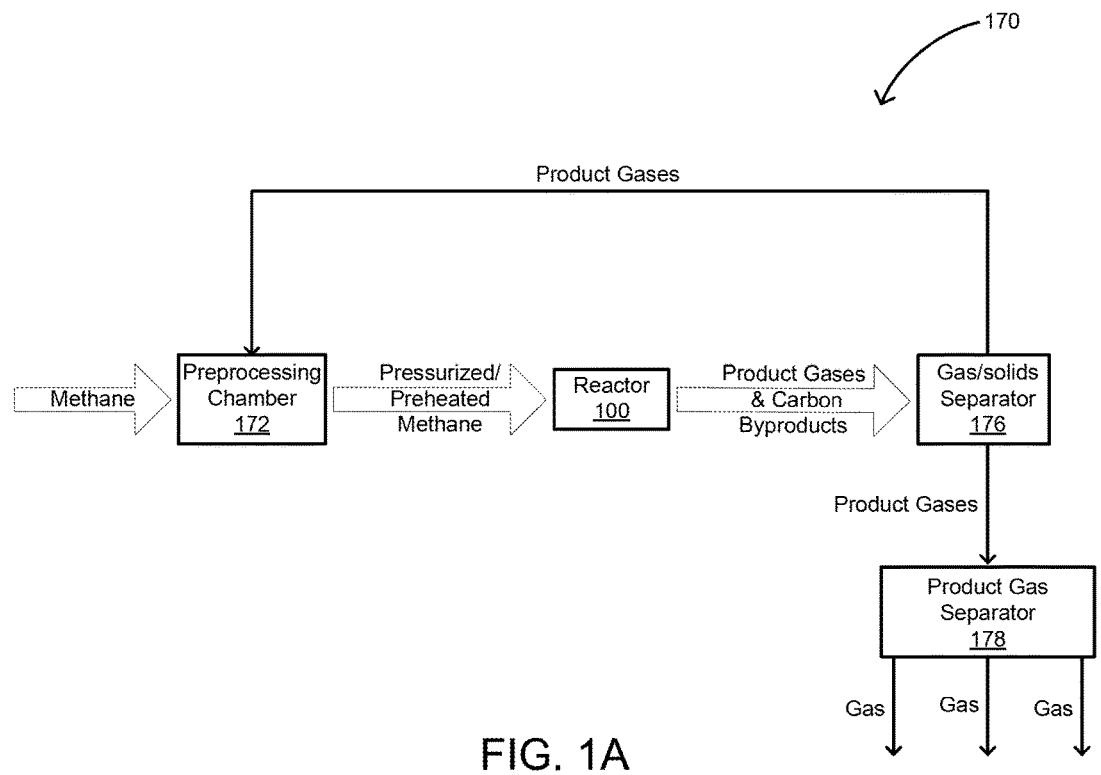
FIG. 1A illustrates a system configured for facilitating dissociation of methane at low temperatures and/or pressures utilizing a reactor designed to generate shockwaves in a supersonic gaseous vortex, in accordance with one or more implementations.

FIG. 1A illustrates a system 170 configured for facilitating dissociation of methane at low temperatures and/or pressures utilizing a reactor 100 designed to generate shockwaves in a supersonic gaseous vortex, in accordance with one or more implementations. It will be appreciated that, although system 170 is described herein in the context of processing methane, this is not intended to be limiting as other hydrocarbons may be processed (e.g., dissociated) by system 170 in some implementations. In addition to reactor 100, system 170 may include one or more of a preprocessing chamber 172, a gas/solid separator 176, a product gas separator 178, and/or other components.

The preprocessing chamber 172 may be configured to receive methane. The preprocessing chamber 172 may be configured to pressurize the methane. According to some implementations, the methane may be pressurized to a pressure of 350 kPa or more. The preprocessing chamber 172 may be configured to heat the methane. In some implementations, the methane may be heated to a temperature below a dissociation temperature of methane. The pressurization and/or heating of the methane may be achieved with conventional apparatuses suited for those purposes, in accordance with some implementations.

The reactor 100 may be configured to receive methane from the preprocessing chamber 172. The reactor may be configured to dissociate methane. The reactor may be configured to operate at a temperature above the dissociation temperature of methane. In some implementations, the methane may enter the reactor 100 through a converging diverging nozzle. The nozzle dimensions may be configured to cause the methane exiting the nozzle to be travelling at least one and a half times speed of sound in methane at that temperature and pressure. The nozzle may be designed to impart supersonic shock waves in the gas. According to some implementations, the methane may be dissociated into one or more produce gases and/or one or more carbon byproducts. Examples of product gases and carbon byproducts may include one or more of hydrogen, alkenes, carbon dust, amorphous carbon, graphitic carbon, carbon nanoparticle structures, carbon nano tubes, graphene and/or other product gases and/or carbon by products.

Figure 2:
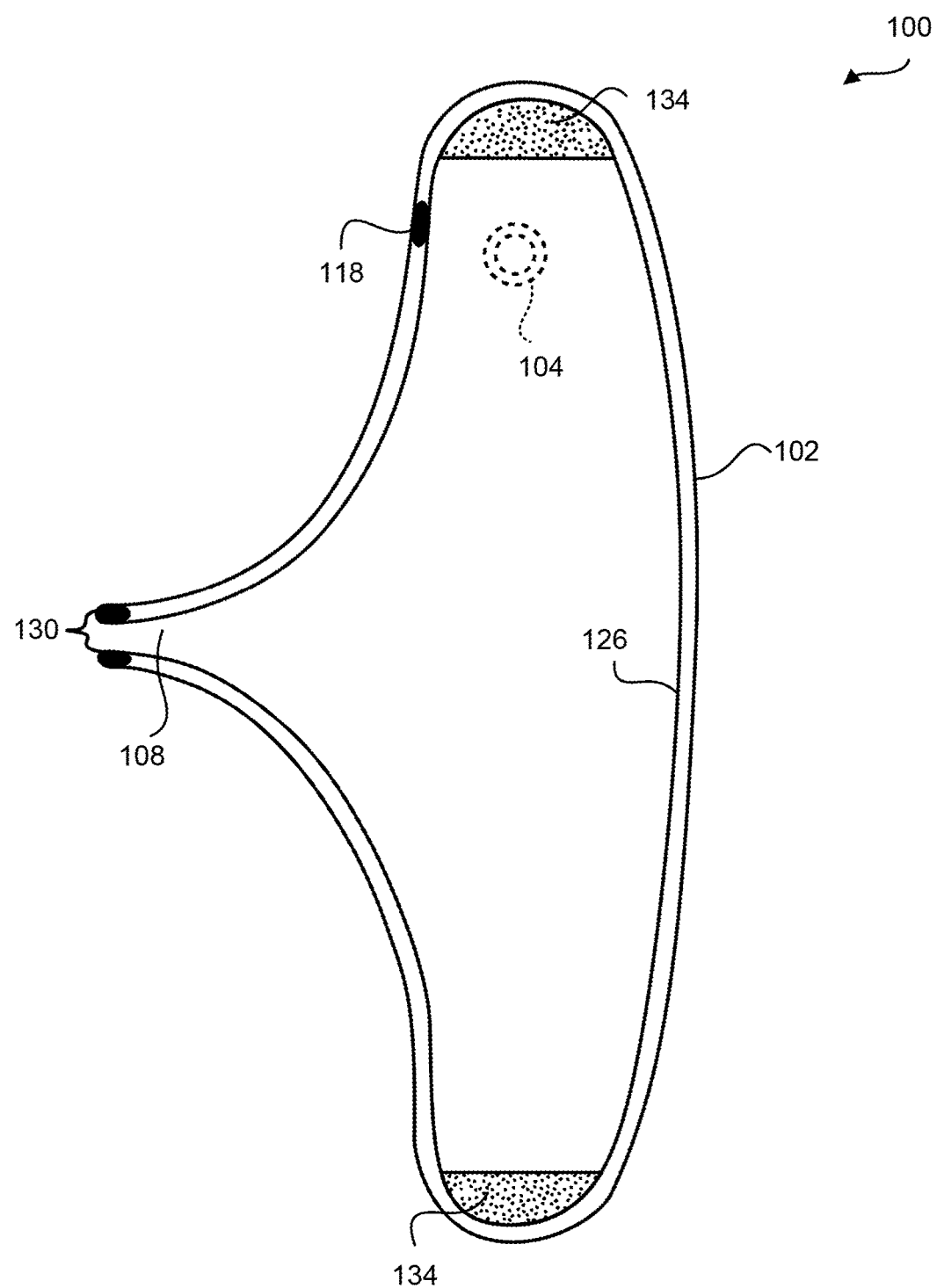
FIG. 2 illustrates a side view of the reactor, in accordance with one or more implementations.

FIGS. 1 and 2 illustrate a top and a side view of reactor 100, respectively, in accordance with one or more implementations. With continuous reference to FIGS. 1 and 2, reactor 100 will be described. As shown, reactor 100 may include one or more of a chamber 102, a first gas inlet 104, an outlet 108, a second gas inlet 110, a first replaceable wear part 112, and/or other components.

Chamber 102 may be configured to provide a volume in which methane processing occurs. Chamber 102 may have a substantially circular cross-section centered on a longitudinal axis 124 that is normal to the cross-section. The substantially circular cross-section may facilitate a vortex rotating within chamber 102. A radius of the substantially circular cross-section of chamber 102 may continuously decrease at an end of chamber 102 proximal to outlet 108. The continuous decrease of the radius of the substantially circular cross-section of chamber 102 may be configured to cause an acceleration of a rotational speed of the gaseous vortex. As the continuous decrease of the radius of the substantially circular cross-section of chamber 102 may be shaped as a cone (illustrated in FIG. 2), a hemisphere, a horn-shape, and/or other shapes.

Chamber 102 may be formed of various materials. Chamber 102 may be formed of a rigid material. Chamber 102 may be formed of a thermally conductive material. Chamber 102 may be formed of an electrically conductive material. According to some implementations, chamber 102 may be formed wholly or partially of steel, iron, iron alloys, silicon carbide, partially stabilized zirconia (PSZ), fused alumina, tungsten carbide, boron nitride, carbides, nitrides, ceramics, silicates, geopolymers, metallic alloys, other alloys, and/or other materials. In some implementations, an internal surface 116 of chamber 102 may be coated with one or more coatings. An exemplary coating may be configured to prevent physical or chemical wear to internal surface 116 of chamber 102. In some implementations, a coating may be configured to promote a chemical reaction within chamber 102. An example of a coating that may promote a chemical reaction may include one or more of iron; nickel; ruthenium; rhodium; platinum; palladium; cobalt; other transition metals and their alloys, compounds, and/or oxides (e.g., the lanthanide series and their compounds, alloys, and/or oxides); and/or other materials.

The first gas inlet 104 may be configured to introduce a high-velocity stream of methane gas into chamber 102. The first gas inlet 104 may be disposed and arranged so as to effectuate a vortex of the stream of gas circulating within chamber 102. The vortex may rotate about longitudinal axis of chamber 102. The gas inlet may be disposed so that the gas stream 116 is directed substantially perpendicular to longitudinal axis 124 of chamber 102. The first gas inlet 104 may be disposed so that the gas stream 116 is directed substantially tangent to a portion of the internal surface 126 of the substantially circular cross-section of chamber 102.

According to some implementations, the first gas inlet 104 may comprise inlet gas nozzle (not depicted in this example) disposed within the first gas inlet 104. In those implementations, the inlet nozzle may be configured to accelerate the stream of gas being introduced into chamber 102, to emit the stream of gas at a supersonic speed, to emit shockwaves in the stream of gas emitted from inlet nozzle, and/or for any other purposes. Exemplary implementations of a gas inlet (e.g., first gas inlet 104) and/or an inlet nozzle are disclosed in U.S. patent application Ser. No. 14/298,868 filed on Jun. 6, 2014 and entitled "A REACTOR CONFIGURED TO FACILITATE CHEMICAL REACTIONS AND/OR COMMINUTION OF SOLID FEED MATERIALS" and U.S. patent application Ser. No. 14/298,877 filed on Jun. 6, 2014, and entitled "SYSTEMS AND METHODS FOR PROCESSING SOLID MATERIALS USING SHOCKWAVES PRODUCED IN A SUPERSONIC GASEOUS VORTEX," which are both incorporated herein by reference.

The gas stream 116 introduced by the first gas inlet 104 may include any number of gaseous materials. In some implementations, the gas may include one or more of steam, methane, ethane, propane, butane, pentane, ammonia, hydrogen, carbon monoxide, carbon dioxide, oxygen, nitrogen, chlorine, fluorine, ethene, hydrogen sulphide, acetylene, carbonyls and/or other halogenated metal complexes, and/or other gaseous materials. In some implementations, in the gas, a wide variety of chemical reactions that are normally multiple step reactions, e.g., due to Le Chateliers principle. Such a wide variety of chemical reactions may be possible in the reactor 100 because of the wide temperature and pressure difference within the reactor 100 itself. As soon as a given reaction has taken place due to pressure and/or temperature and/or catalytic action within the reactor the products are conveyed to a region within the reactor in nanoseconds where the temperature and pressure are reduced. This makes a great number of organic and organo metal reactions possible in a greatly reduced number of steps. It also makes many chemical reactions possible or economic that are not presently practicable or even attainable. Applications include pharmaceuticals, insecticides, and the precursor organo metals or carbonyls, which are used in Chemical Vapor Deposition (CVD) used in integrated circuit manufacture, electronics in general as well as 3D printing of metals Methane may be processed by reactor 100 by mechanisms facilitated by shockwaves 128 within chamber 102. For example, methane may be processed by cavitation in the stream of gas within chamber 102. Methane may undergo a chemical transformation due to the catalytic effect built into the first replaceable part wear part 112, and/or due to the electric field imparted on the first replaceable part wear part 122.

The outlet 108 may be configured to emit the gas and processed material from chamber 102. The outlet 108 may be disposed at an end of chamber 102 opposite to the first gas inlet 104. The outlet may be disposed on longitudinal axis 124 of chamber 102.

In some implementations, outlet 108 may include one or more of an outlet nozzle 130 (illustrated in FIG. 2) disposed within outlet 108. The outlet nozzle 130 may be configured to pressurize chamber 102. The outlet nozzle 130 may be configured to effectuate a rapid cooling of processed gases and/or carbon byproducts exiting chamber 102. According to some implementations, such rapid cooling may reduce or minimize back reactions. In some implementations, the outlet nozzle 130 may include a venturi tube (not depicted).

For resisting wear in reactor 100, a first replaceable wear part 112 may be disposed at a first portion 122 of the inner surface 126 of chamber 102. The first portion 122 may be an area on the inner surface 126 where the stream 116 contacts the surface 126. As such, the first portion 122 may be opposite to the first gas inlet 104 within chamber 102. The first replaceable wear part 112 may be disposed at the first portion 122 in a way to absorb impacts to first portion 122 on the inner surface 126 caused by gases and/or carbon byproducts entrained by the gas stream 116 introduced by the first gas inlet 104. The first replaceable wear part 112 may be made of hard material such as tungsten carbide, titanium carbide, or titanium nitride, diamond, and/or any other materials for wear resistance. In some implementations, the first replaceable wear part 112 may have a polycrystalline diamond facing.

Figure 3:
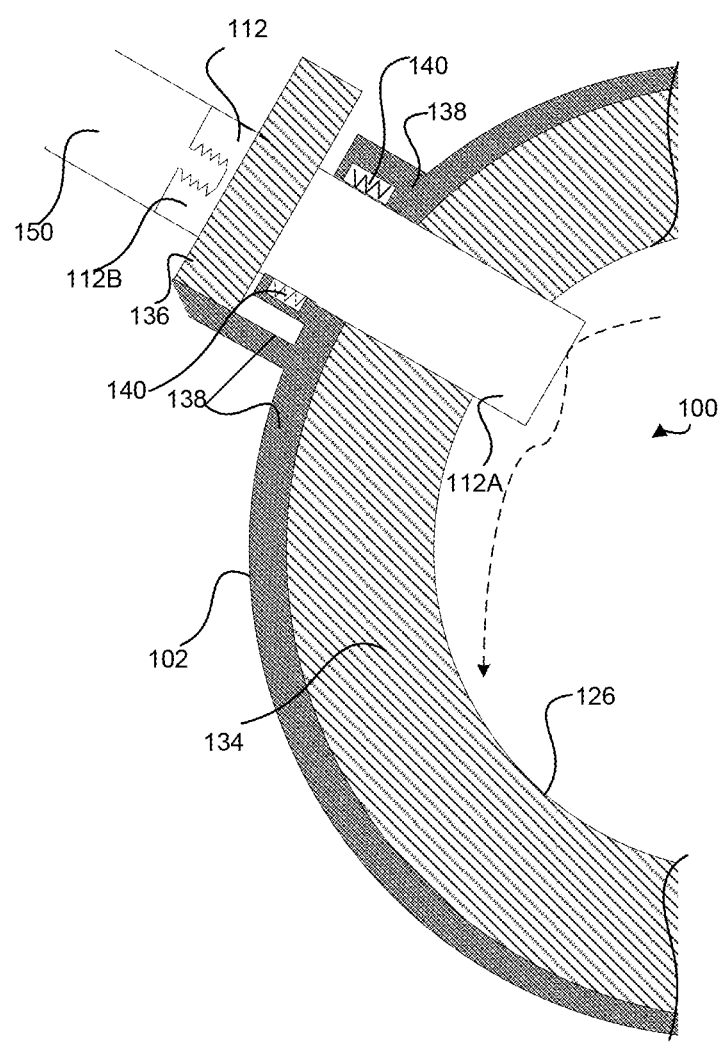
FIG. 3 illustrates one example of first replaceable wear part of the reactor shown in FIGS. 1 and 2 in a detailed view.

In some implementations, the first replaceable wear part 122 may be configured to continuously advance into the chamber as the surface of the contact end is worn. FIG. 3 illustrates one example of a first replaceable wear part 122 in a detailed view. It will be described with reference to FIGS. 1 and 2. As shown in this example, the first replaceable wear part 112 may comprise a first end 112A, e.g., the contacting end of the first replaceable wear part 112, and a second end 122B that is opposite to the first end 112A. As shown, the first replaceable wear part 112 may comprise a thruster 136 configured to continuously feed the first replaceable wear part 112 into chamber 102 as the surface of the first replaceable wear part 112 is worn by the impacts caused by the carbon byproducts. As also shown in this example, casing 138 may be employed to be lined around chamber 102 and serve as a support to the first replaceable wear part 112. As still shown, around the casing 138 where the first replaceable wear part 112 enters chamber 102, seals 140 may be employed. Seals 140 may facilitate removal of the first replaceable wear part 112 for maintenance or replacement. The facilitated removal of first replaceable wear part 112 may reduce scheduled downtime as compared to the conventional jet mill. As shown, a second replaceable wear part 150 may be coupled to the first replaceable wear part 112 at the second end 112B of the first replaceable wear part 112. This may facilitate continuous feeding of replaceable wear parts into chamber 102.

In some implementations, the first replaceable wear part 112 may comprise a rotatable cylindrical rod adapted to control impacts of carbon byproducts. In those implementations, the cylindrical rod may rotate about the axis of its cylinder when the pulverized particles contact the rod. The rotation of the rod may allow the wear to be controlled on the surface of the rod.

Various forms of catalysis may be used to reduce the dissociation temperature and/or increase the reaction rate. In some implementations, the contacting end of the first replaceable wear part 112 may be coated with catalyst material. The coating may be configured to protect the surface of the contacting end of the first replaceable wear part 112, and/or to promote a chemical reaction within chamber 102. For example, the catalyst material may be incorporated into the matrix of the first replaceable wear part 112 during manufacturing of the first replaceable wear part 112. The catalyst material that may be coated on the contacting end of the first replaceable wear part 112 may include one or more of platinum, palladium, and/or any other catalyst material for aiding the chemical reaction(s), and/or the comminution inside chamber 102. The coating on the first replaceable wear part 112 may be configured such that the coated catalyst material ablates from the surface of the first replaceable wear part 112 at a rate that exposes a new clean surface of the first replaceable wear part 112. The ablated catalyst material may increase the throughput, and/or activity in chamber 102 by increasing the rate of reactions without a need to physically scale the size of reactor 100.

In some implementations, the first replaceable wear part 112 may be configured to be electronically isolated from chamber 102, and/or other components of reactor 100. This may facilitate an electrical field on the first replaceable wear part 112 having a variable voltage, amperage, frequency, waveform, and/or any other type(s) electrical potential to aid chemical reaction in chamber 102. In those implementations, the first replaceable wear part 112 may enable the Non-Faradaic Electrochemical Modification of Catalytic Activity (NEMCA), also known as Electrochemical Promotion of Catalysis (EPOC), for reducing energy required for comminution, and/or the chemical reactions inside chamber 102.

In some implementations the first replaceable wear part may be made entirely or partially of a material which is designed to act as the initiator or nucleus in carbon nanotube formation. This material may include iron and various alloys as well as materials like Ruthenium, which if incorporated into carbon nanotubes produces a material that exhibits super conductivity at elevated temperatures. It may also include rare earths and many other less exotic metals which give a wide variety of physical and electronic properties.

Returning to FIGS. 1 and 2, in some implementations, reactor 100 may comprise a second gas inlet 110 for controlling the direction of the gas stream 116. As shown, the second gas inlet 110 may be arranged proximal to the first gas inlet 104. The second gas inlet 110 may comprise a nozzle configured to introduce a gas stream 118 to produce a "steering effect" to the gas stream 116. That is, the gas stream 118 may be introduced to control the direction of the first gas stream 116 such that the first gas stream 116 may be directed to a particular direction to even out wear in chamber 102. To achieve this, the second gas inlet 110 may be disposed such that the gas stream 118 may have an axial flow configured to intercept the gas stream 116 introduced by the first gas inlet 104. As illustrated, the second gas inlet 110 may be employed to "steer" the gas stream 116 towards a desired area on the inner surface 126 of chamber 102. For example, without limitation, the second gas inlet 110 may be employed to steer the gas stream towards the first replaceable wear part 112 for limiting wear impact to the first replaceable wear part 112. In another example, the second gas inlet 118 may be disposed such that the gas stream 116 is directed to a second portion of the inner surface 126 of reactor 100 to even out wear inside chamber 102. In some implementations, gas stream 118 may be configured to introduce eddy current and interference currents into chamber 102 to vary the shock wave effects of reactor 100.

In some implementations, inner surface 126 of chamber 102 may comprise pockets (e.g., disruptors) around the periphery of the chamber 126. The pockets may be configured with appropriate sizes to receive some or all of the process material such that it is packed into the inner surface 126. FIG. 2 illustrates such pockets 134 on the inner surface 126 of chamber 102. The process material that is packed by the pockets may form a layer on the inner surface 126 to effect "material on material" wear resistance. That is, the process material packed into the pockets on the inner surface 126 may form a "new surface" of chamber 102 with the same hardness as the process material impacting the chamber 102.

Figure 4:
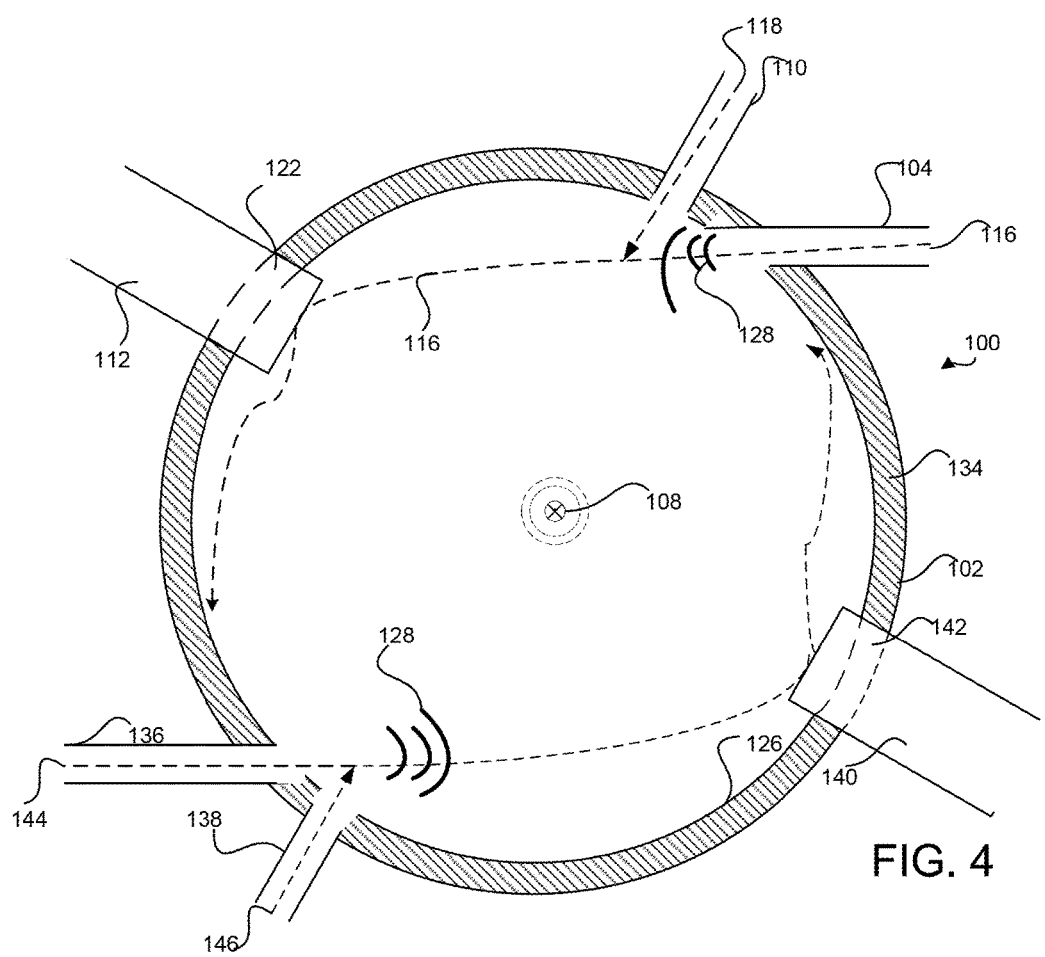
FIG. 4 illustrates one example of including multiple gas inlets and replaceable wear parts in the reactor shown in FIGS. 1 and 2.

In some implementations, additional gas inlets and replaceable wear parts may be included in reactor 100 to reduce and control effects caused by drag or boundary layers in reactor 100 as process material is required to travel a long flight path before existing. FIG. 4 illustrates one example of including multiple gas inlets and replaceable wear parts in reactor 100. It will be described with reference to FIGS. 1 and 2. As shown, in addition to the first gas inlet 104, the second gas inlet 110 and the first replaceable wear part 112, reactor 100 may further comprise a third gas inlet 144, a fourth gas inlet 146, and a second replaceable wear part 142 arranged similarly to the arrangement of the first gas inlet 104, the second gas inlet 110 and the first replaceable wear part 112. That is, the fourth gas inlet 138 may be disposed proximal to the third gas inlet 144 such that gas stream 146 introduced by the fourth gas inlet 128 may "steer" the supersonic gas stream 144 introduced by the third gas inlet 144. As shown, the second replaceable wear part 140 may be disposed at a second portion 142 of inner surface 126 of chamber 102. The second portion 142 may be an area of inner surface 126 where gas stream 144, charged with carbon byproducts from the processes methane, impacts the inner surface 126.

Figure 5:
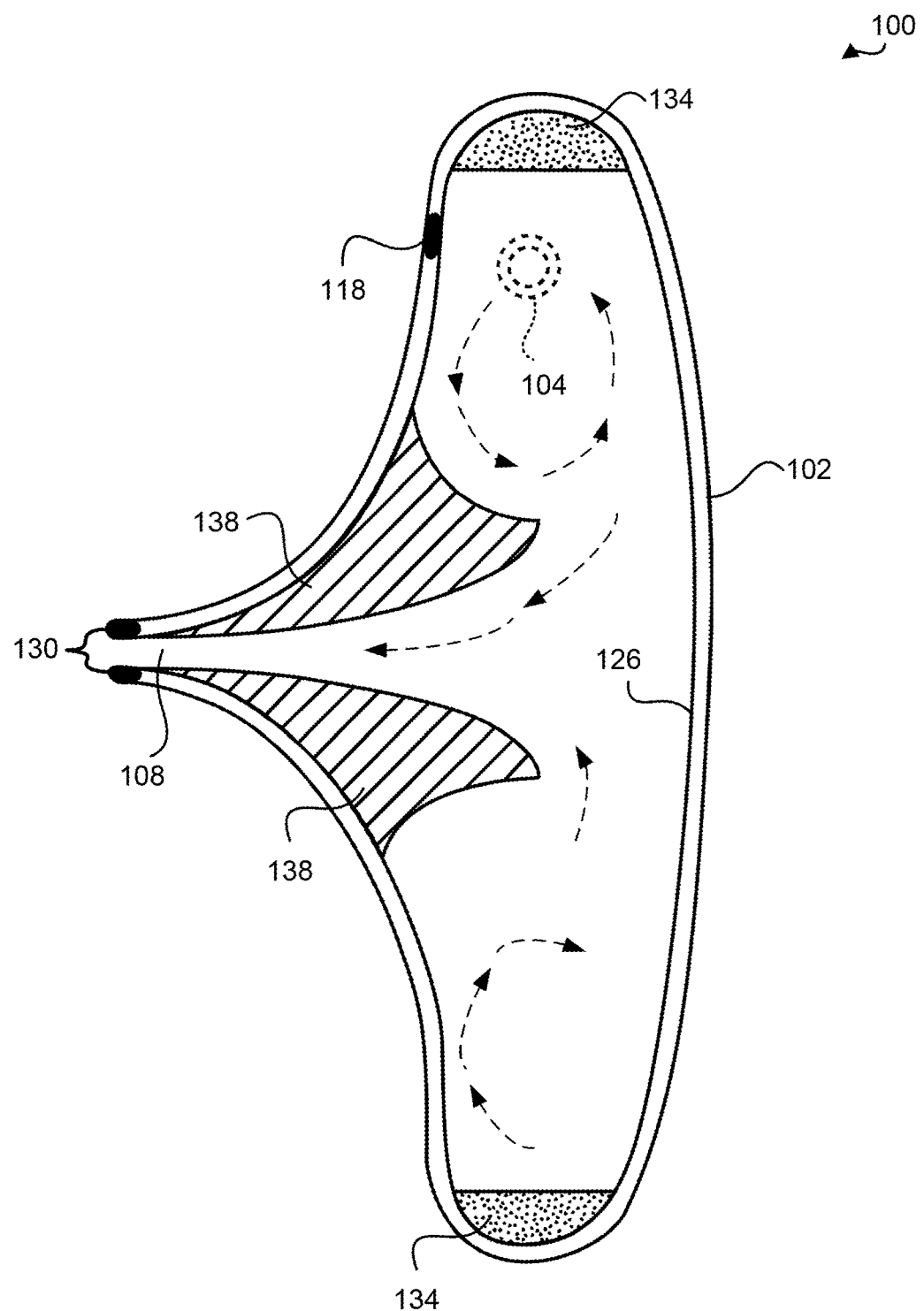
FIG. 5 illustrates one example of a shape of the interior volume of chamber designed to control the wear impact.
Figure 6:
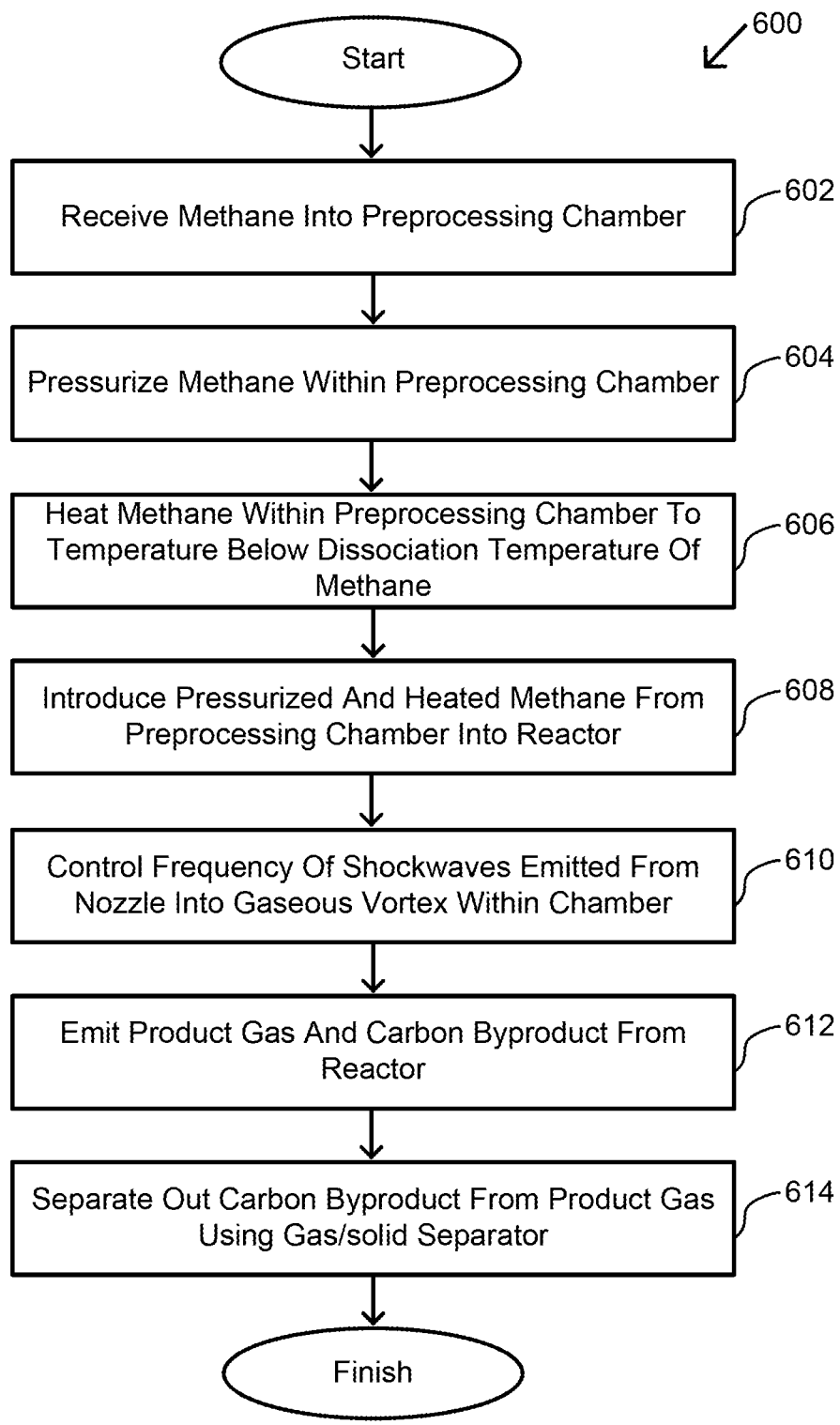
FIG. 6 illustrates a method for facilitating dissociation of methane at low temperatures and/or pressures utilizing a reactor designed to generate shockwaves in a supersonic gaseous vortex, in accordance with one or more implementations.

Returning to FIGS. 1 and 2, in some implementations, the shape of the interior volume of chamber 102 may be configured to control wear impact to be on desired areas within chamber 102. FIG. 5 illustrates one example of a shape of the interior volume of chamber 102 designed to control the wear impact. It will be described with reference to FIGS. 1 and 2. As shown in this example, reactor 100 may comprise casings 138 that may "partition" chamber 102 into multiple sections. In this example, the casings 138 "partitions" chamber 102 into sub-chambers in which majority of the gaseous vortex takes place as illustrated. In this way, the wear impact during the pulverization process may be controlled to be controlled in desired areas within chamber 102.

Other components that may be included in reactor 100 may include, a heating component configured to provide heat to chamber 102, a ventilation component 122 configured to vent gas from a region surrounding chamber 102, one or more sensors configured to provide a signal conveying information related to one or more parameters associated with reactor 100, and/or any other components. Exemplary implementations of reactor 100 and/or components of reactor 100 are disclosed in U.S. patent application Ser. No. 14/690,111 filed on Apr. 17, 2015 and entitled "PROVIDING WEAR RESISTANCE IN A REACTOR CONFIGURED TO FACILITATE CHEMICAL REACTIONS AND/OR COMMINUTION OF SOLID FEED MATERIALS USING SHOCKWAVES CREATED IN A SUPERSONIC GASEOUS VORTEX," which is incorporated herein by reference.

From a theoretical point of view, 74.9 kJ may be needed per mole to dissociate methane. The enthalpy of combustion of the two moles of hydrogen produced from this dissociation can provide 572 kJ of energy. This may mean that the energy available from the combustion of the hydrogen exceeds the energy needed for dissociation by about seven times. According to some implementations, the overall efficiency of system 170, which may include a combination of insulation and recuperation, determines how much of the available energy may be needed for reactions and hence the amount of hydrogen leftover after dissociation.

Referring again to FIG. 1A, gas/solid separator 176 may be configured to receive the product gases and carbon byproduct from the reactor 100. The gas/solid separator may be configured to separate out the carbon byproduct from the product gases. In some implementations, the gas/solid separator 176 may include one or more of a cyclone, a bag house, a spray tower, a venturi scrubber, and/or other gas/solid separators 176. In some implementations, a portion of the product gases may be fed back to the preprocessing chamber 172 to be reprocessed through the reactor 100. The portion of the product gases may be fed back to the preprocessing chamber 172 via a heated conduit to prevent back reactions. In some implementation, a portion of the hydrogen produced may be used to drive processing by the reactor 100.

The product gas separator 178 may be configured to receive product gases and separate the product gases into individual types or mixtures of gases. In some implementations, the product gas separator 178 may include Commercial Off The Shelf (COTS) equipment and/or other suitable apparatuses.

In some implementations the gases can be separated by differential cyclones, or by liquefaction. By electro static charge, magnetic susceptibility, or by a Calutron type device which can separate gases with very small physical differences.

In some implementations, system 170 may include a gas cleanup unit (not depicted), which may be configured to clean the product gas. The gas cleanup unit may clean the product by way of one or more of dust collection, a dry and wet processes for removing gaseous pollutants, separating heavy metals, abating acid gas, abating dioxins, abating furans, and/or other processes for cleaning gas. With the addition of absorbents or adsorbents of typically alkali metal oxides, carbonates, hydroxides or the like, products like sulphur and chlorine can be captured in the primary reactor, with the byproducts reporting to the solids where they are readily separated.

With the ability to be adaptable to different volumes, the system 170 and/or reactor 100 may have a great ability to make use of gas streams that would otherwise be flared, and turn the waste gas stream from a liability into an asset. The hydrogen produced may be used as a feedstock for many applications both as a fuel in itself for stationary and/or mobile applications and as a chemical feedstock in a variety of operations such as the production of one or more of ammonia, nitric acid, ammonium nitrate, urea, cyanide, acetylene, and/or other useful substances. Exemplary implementations may be used to lighten heavy oils or tars into lighter fractions, which are more readily saleable and have much higher value. The carbon byproducts may have many existing markets ranging from printer inks, tire manufacturing, soil upgrading, various specialty markets, and/or other markets.

At an operation 602, methane may be received into a preprocessing chamber (e.g., preprocessing chamber 172).

At an operation 604, the methane within the preprocessing chamber may be pressurized. In some implementations, the methane may be pressurized to a pressure of 350 kPa or more.

At an operation 606, the methane within the preprocessing chamber may be heated to a temperature below a dissociation temperature of methane.

At an operation 608, the pressurized and heated methane from the preprocessing chamber may be introduced into a reactor (e.g., reactor 100) configured to dissociate methane. The reactor may be configured to operate at a temperature above the dissociation temperature of methane. The methane may be introduced into the reactor as a gas stream substantially tangentially to an inner surface of a chamber of the reactor to effectuate a gaseous vortex rotating about the longitudinal axis within the chamber. The gas stream may be introduced via a gas inlet disposed at a first end of the reactor. The gas inlet may comprise a nozzle that accelerates the gas stream to a supersonic velocity.

At an operation 610, a frequency of shockwaves emitted from the nozzle into the gaseous vortex may be controlled.

At an operation 612, product gas and carbon byproduct may be emitted from the chamber of the reactor via an outlet disposed on the longitudinal axis at a second end of the chamber opposite from the first end.

At an operation 614, the carbon byproduct may be separated out from the product gas using a gas/solid separator (e.g., gas/solid separator 176).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured for facilitating dissociation of methane at low temperatures and/or pressures utilizing a reactor designed to generate shockwaves in a supersonic gaseous vortex, the system comprising:
   a preprocessing chamber configured to receive methane, pressurize the methane to a pressure as low as 350 kPa, and heat the methane to a temperature below a dissociation temperature of methane;
   a reactor configured to dissociate methane received from the preprocessing chamber, the reactor being further configured to operate at a temperature above the dissociation temperature of methane, the reactor including:
   a chamber having a substantially circular cross-section centered on a longitudinal axis;
   a gas inlet disposed at a first end of the chamber and arranged to emit the methane as a gas stream tangentially to the inner surface of the chamber to effectuate a gaseous vortex rotating about the longitudinal axis within the chamber, the gas inlet comprising a converging diverging nozzle that accelerates the gas stream to a supersonic velocity, wherein the nozzle is configured to cause methane exiting the nozzle to be travelling at least one-and-a-half times the speed of sound in methane at the temperature and pressure of the methane, the nozzle being structured to adjustably control a frequency of shockwaves emitted from the nozzle into the gaseous vortex, wherein the frequency of shockwaves is adjustable to influence dissociation of the methane introduced into the chamber of the reactor; and
   an outlet disposed on the longitudinal axis at a second end of the chamber opposite from the first end, the outlet being configured to emit product gases and carbon byproduct from the chamber; and
   a gas/solid separator configured to receive the product gases and carbon byproduct from the reactor and separate out the carbon byproduct from the product gases, wherein a radius of the substantially circular cross-section of the chamber continuously decreases at the second end of the chamber proximal to the outlet.

2. The system of claim 1, further comprising a product gas separator configured to receive the product gases and separate the product gases into individual types or mixtures of gases.

3. The system of claim 1, wherein the product gases and carbon byproducts include one or more of hydrogen, alkenes, carbon dust, amorphous carbon, graphitic carbon, or carbon nanoparticle structures.

4. The system of claim 1, wherein the reactor further includes a replaceable wear part configured to protect the inner surface of the chamber, the replaceable wear part being disposed within the chamber such that the gas stream impinges on the replaceable wear part as the gas stream is emitted from the gas inlet instead of impinging on the inner surface of the chamber.

5. The system of claim 4, wherein the replaceable wear part is made of one or more of tungsten carbide, titanium carbide, titanium nitride, or diamond.

6. The system of claim 4, wherein the replaceable wear part includes a catalytic material.

7. The system of claim 6, wherein the catalytic material includes one or both of platinum or palladium.

8. The system of claim 4, wherein the replaceable wear part is configured to be continuously fed into the chamber of the reactor during operation.

9. The system of claim 1, wherein the gas stream emitted by the gas inlet into the chamber of the reactor has a temperature of approximately 500 degrees Celsius.

10. The system of claim 1, wherein complete dissociation of the methane is achieved with the gas stream emitted by the gas inlet into the chamber of the reactor being at a temperature of approximately 500 degrees Celsius.

11. The system of claim 1, wherein a portion of the product gases is fed back to the preprocessing chamber to be reprocessed through the reactor.

12. The system of claim 1, wherein the portion of the product gases is fed back to the preprocessing chamber via a heated conduit to prevent back reactions.

13. The system of claim 1, wherein the gas/solid separator includes one or more of a cyclone, a bag house, a spray tower, or a venturi scrubber.

14. The system of claim 1, wherein the chamber has a substantially circular cross-section and wherein a radius of the substantially circular cross-section of the chamber continuously decreases at the second end of the chamber proximal to the outlet.

15. A method for facilitating dissociation of methane at low temperatures and/or pressures utilizing a reactor designed to generate shockwaves in a supersonic gaseous vortex, the method comprising:
    receiving methane into a preprocessing chamber;
    pressurizing the methane within the preprocessing chamber to a pressure as low as 350 kPa;
    heating the methane within the preprocessing chamber to a temperature below a dissociation temperature of methane;
    introducing the pressurized and heated methane from the preprocessing chamber into a reactor configured to dissociate methane, the reactor being further configured to operate at a temperature above the dissociation temperature of methane, the methane being introduced into the reactor as a gas stream tangentially to an inner surface of a chamber of the reactor to effectuate a gaseous vortex rotating about the longitudinal axis within the chamber, the gas stream being introduced via a gas inlet disposed at a first end of the reactor;
    controlling a frequency of shockwaves emitted from a converging diverging nozzle into the gaseous vortex;
    emitting product gas and carbon byproduct from the chamber of the reactor via an outlet disposed on the longitudinal axis at a second end of the chamber opposite from the first end, wherein the nozzle accelerates the gas stream to a supersonic velocity, wherein the nozzle is configured to cause methane exiting the nozzle to be travelling at least one-and-a-half times the speed of sound in methane at the temperature and pressure of the methane, and wherein the frequency of shockwaves is adjustable to influence dissociation of the methane introduced into the chamber of the reactor; and
    separating out the carbon byproduct from the product gas using a gas/solid separator.

16. The method of claim 15, further comprising separating the product gases into individual types or mixtures of gases.

17. The method of claim 15, wherein the product gases and carbon byproducts include one or more of hydrogen, alkenes, carbon dust, amorphous carbon, graphitic carbon, or carbon nanoparticle structures.

18. The method of claim 15, wherein complete dissociation of the methane is achieved with the gas stream emitted by the gas inlet into the chamber of the reactor being at a temperature of approximately 500 degrees Celsius.

19. The method of claim 15, further comprising feeding back a portion of the product gases to the preprocessing chamber to be reprocessed through the reactor.

20. The method of claim 15, wherein the chamber has a substantially circular cross-section and wherein a radius of the substantially circular cross-section of the chamber continuously decreases at the second end of the chamber proximal to the outlet.

* * * * *